US008487065B2

(12) United States Patent
Mahood et al.

(10) Patent No.: US 8,487,065 B2
(45) Date of Patent: *Jul. 16, 2013

(54) COPOLYCARBONATE-POLYESTERS, METHODS OF MANUFACTURE, AND USES THEREOF

(75) Inventors: James A. Mahood, Evansville, IN (US); Karthik Balakrishnan, Houston, TX (US); Adam Zerda, Oak Ridge, NJ (US)

(73) Assignee: SABIC Innovative Plastics IP B.V. (NL)

( * ) Notice: Subject to any disclaimer, the term of this patent is extended or adjusted under 35 U.S.C. 154(b) by 587 days.

This patent is subject to a terminal disclaimer.

(21) Appl. No.: 12/699,309

(22) Filed: Feb. 3, 2010

(65) Prior Publication Data

US 2010/0286358 A1    Nov. 11, 2010

Related U.S. Application Data

(60) Continuation-in-part of application No. 12/255,437, filed on Oct. 21, 2008, now Pat. No. 8,318,891, which is a division of application No. 11/290,967, filed on Nov. 30, 2005, now Pat. No. 7,495,066.

(51) Int. Cl.
*C08G 64/00* (2006.01)
(52) U.S. Cl.
USPC ........... 528/196; 525/178; 528/172; 528/201; 528/203; 528/204
(58) Field of Classification Search
USPC ................. 525/178; 528/172, 196, 201, 203, 528/204
See application file for complete search history.

(56) References Cited

U.S. PATENT DOCUMENTS

| | | | |
|---|---|---|---|
| 4,134,936 A | 1/1979 | Byrne et al. | |
| 4,154,775 A | 5/1979 | Axelrod | |
| 4,217,438 A | 8/1980 | Brunelle et al. | |
| 4,310,652 A | 1/1982 | DeBona et al. | |
| 5,344,910 A | 9/1994 | Sybert | |
| 5,455,310 A | 10/1995 | Hoover et al. | |
| 5,804,525 A | 9/1998 | Boden et al. | |
| 7,135,577 B2 | 11/2006 | Rai et al. | |
| 7,277,230 B2* | 10/2007 | Srinivasan et al. | 359/642 |
| 7,495,066 B2 | 2/2009 | Balakrishnan et al. | |
| 2005/0222334 A1* | 10/2005 | Srinivasan et al. | 525/178 |
| 2005/0228137 A1 | 10/2005 | Srinivasan et al. | |
| 2007/0123688 A1 | 5/2007 | Mahood et al. | |
| 2009/0043070 A1 | 2/2009 | Balakrishnan et al. | |

FOREIGN PATENT DOCUMENTS

| | | |
|---|---|---|
| JP | 58173125 A | 10/1983 |
| JP | 2005272612 A | 10/2005 |

OTHER PUBLICATIONS

Japanese Patent No. 2005272612A; Date of Publication: Oct. 6, 2005; Abstract only; 1 page.
Japanese Patent No. 58173125A; Publication Date: Oct. 12, 1983; Abstract Only; 1 page.
Vasilii V. Korshak, Svetlana V. Vinogradova, and Yacob S. Vygodskii; "Cardo Polymers" XP009019830; Institute of Element-Organic Compounds, Moscow, USSR; J. Macromol.Sci.-Rev. Macromol. Chem., C11(1), 45-142 (1974); 98 Pages.
International Search Report for PCT/US2011/023267, mailed Apr. 18, 2011, 4 pages.
Written Opinion of International Search Report for PCT/US2011/023267, mailed Apr. 18, 2011, 4 pages.
Boranowska, Z. et al, •Badanie Odpornosci Poliweglanow Na Hydrolize W Srodowisku Zasadowy Polimery, Instytut Chemii Prrzemysowej, Warsaw, PL, vol. 15, No. 1, (1970), pp. 12-14.
International Search Report for International Application No. PCT/US2006/045349, mailed May 2, 2007, 4 pages.
Japanese Publication No. 03-070790; published Mar. 26, 1991, Abstract Only, 1 page.
Japanese Patent Application No. 6-3838, published Jan. 14, 1994, Human Translation, 27 pages.

(Continued)

*Primary Examiner* — Gregory Listvoyb
(74) *Attorney, Agent, or Firm* — Cantor Colburn LLP

(57) ABSTRACT

A copolycarbonate-polyester, comprising units of formula

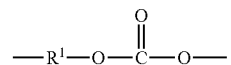

wherein at least 60 percent of the total number of $R^1$ groups are divalent aromatic organic radicals and the balance thereof are divalent aliphatic or alicyclic radicals; units of formula

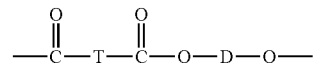

wherein T is a $C_{7-20}$ divalent alkyl aromatic radical or a $C_{6-20}$ divalent aromatic radical, and D is a divalent $C_{6-20}$ aromatic radical; and units of the formula

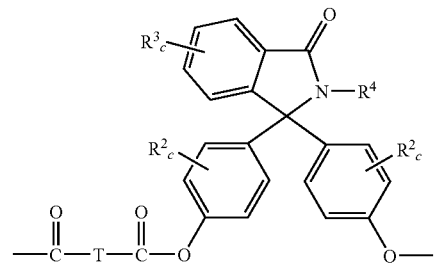

wherein $R^2$ and $R^3$ are each independently a halogen or a $C_{1-6}$ alkyl group, $R^4$ is a methyl or phenyl group, each c is independently 0 to 4, and T is as described above. A method of making a copolycarbonate-polyester is also disclosed.

15 Claims, 1 Drawing Sheet

OTHER PUBLICATIONS

Japanese Patent Application No. 6-82624, published Mar. 25, 1994, Human Translation, 25 pages.

Japanese Publication No. 2820277, published 191-03-26, Machine Translation, 22 pages.

Japanese Publication No. 2005-068216, published Mar. 17, 2005, Machine Translation, 31 pages.

Japanese Publication No. 2005-206834, published Aug. 4, 2005, Machine Translation, 26 pages.

Korshak, V.V. et al Cardo Polymers, Reviews in Macromolecular Chemistry, Marcel Dekker, Inc., New York, vol. C1, No. 1, (1974), pp. 45-142.

M.S. Lin, et al., Polymers With Improved Flammability Characteristics. I. Phenolphthalein-Related Homopolymers; Journal of Polymer Science: Polymer Chemistry Edition, vol. 19, pp. 2659-2670 (1981).

M.S. Lin, et al •Thermal Degradation Study of Phenolphthalein Polycarbonate•, Journal of Polymer Scient: Polymer Chemistry Edition, vol. 19, pp. 2773-2797 (1981).

Written Opinion for International Search Report for International Application No. PCT/US2006/045349; malied May 2, 2007, 5 pages.

* cited by examiner

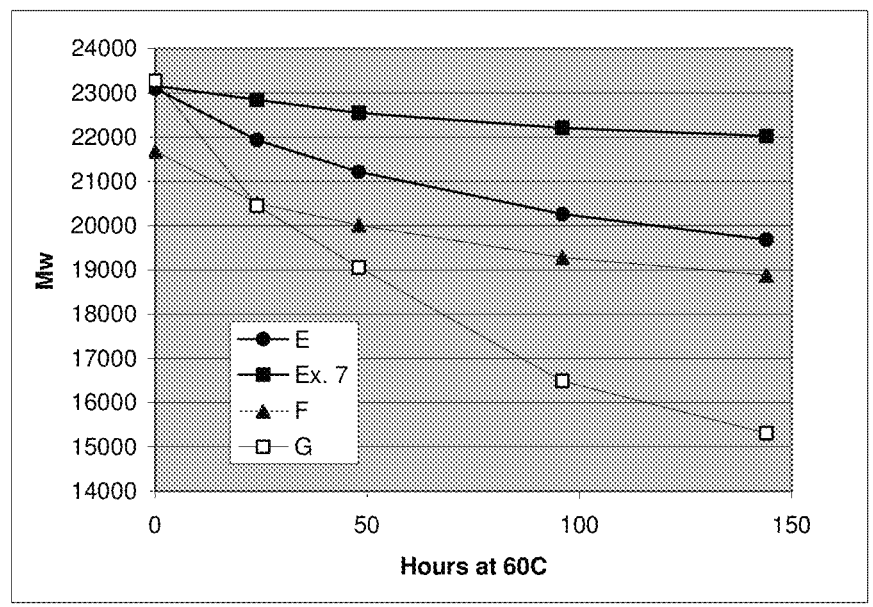

COPOLYCARBONATE-POLYESTERS, METHODS OF MANUFACTURE, AND USES THEREOF

CROSS-REFERENCE TO RELATED APPLICATIONS

This application is a continuation-in-part of application Ser. No. 12/255,437, filed on Oct. 21, 2008, which is a divisional of application Ser. No. 11/290,967, now U.S. Pat. No. 7,495,066, filed Nov. 30, 2005.

BACKGROUND OF THE INVENTION

This disclosure relates to copolycarbonate-polyesters, and in particular to copolycarbonate-polyesters having improved thermal stability, methods of manufacture, and uses thereof.

Polycarbonates derived from 2,2-bis(4-hydroxyphenyl) propane ("bisphenol A," or "BPA") are useful in the manufacture of articles and components for a wide variety of applications, from automotive parts to electronic appliances. 3,3-Bis-(4-hydroxyphenyl)-2-phenyl-2,3-dihydroisoindol-1-one ("BHPD"), as a dihydric phenol reactant, has also been used in the manufacture of polycarbonates. BHPD, alone or in combination with BPA, yields high heat polymers, that is, polymers having a high glass transition temperature (Tg). Use of BHPD in the manufacture of polyesters also leads to polymers having high Tg, but the process is very sensitive, and the polyesters often have significantly lower flow than polycarbonates with the same Tg. While current high heat polymers are suitable for their intended purposes, there nonetheless remains a need in the art for additional high heat polymers that have improved properties, as well as methods for their manufacture.

SUMMARY OF THE INVENTION

In one embodiment, a copolycarbonate-polyester comprises units of the formula

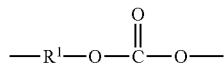

wherein at least about 60 percent of the total number of $R^1$ groups are divalent aromatic organic radicals and the balance thereof are divalent aliphatic, alicyclic, or aromatic radicals; units of the formula

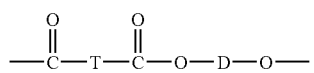

wherein T is a divalent $C_{7-20}$ alkyl aromatic radical or a divalent $C_{6-20}$ aromatic radical, and D is a $C_{6-20}$ divalent radical; and units of the formula

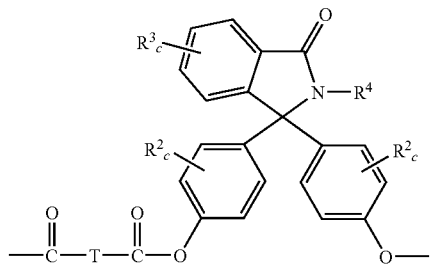

wherein $R^2$ and $R^3$ are each independently a halogen or a $C_{1-6}$ alkyl group, $R^4$ is a methyl or phenyl group, each c is independently 0 to 4, and T is as described above.

In yet another embodiment, an article comprises the above-described copolycarbonate-polyester.

In still another embodiment, a method of manufacture of an article comprises casting, molding, extruding, or shaping the above-described copolycarbonate-polyester into an article.

In another embodiment, a method of manufacture comprises reacting a dihydroxy-terminated polyester intermediate comprising units of formula

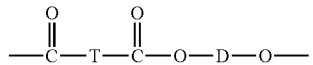

wherein T is a $C_{7-20}$ divalent alkyl aromatic radical or a $C_{6-20}$ divalent aromatic radical, and D is a divalent $C_{6-20}$ aromatic radical; and units of formula

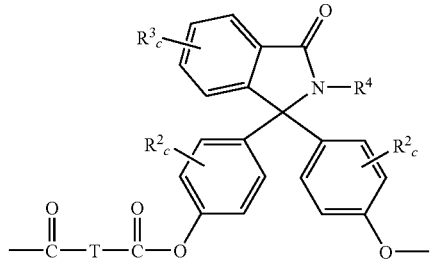

wherein $R^2$ and $R^3$ are each independently a halogen or a $C_{1-6}$ alkyl group, $R^4$ is a methyl, or phenyl group, each c is independently 0 to 4, with a carbonate source and a compound of the formula HO—$R^1$—OH in a reaction mixture comprising water, a substantially water-immiscible organic solvent, and a base, to provide a copolycarbonate-polyester.

Another embodiment comprises a copolycarbonate-polyester manufactured by the foregoing method, and an article comprising the copolycarbonate-polyester.

BRIEF DESCRIPTION OF THE DRAWINGS

FIG. 1 is a graph of weight average molecular weight information for Example 7 and Comparative Examples E, F and G.

DETAILED DESCRIPTION OF THE INVENTION

Copolycarbonate-polyesters comprising polycarbonate units and at least two types of ester units are described herein. The polycarbonate units are derived from a dihydroxy aromatic compound. One type of ester unit is derived from the reaction of an aromatic dicarboxylic acid or derivative thereof with a high heat monomer such as BHPD, and another type of ester unit is derived from the reaction of an aromatic dicarboxylic acid or derivative thereof with an aromatic diol that is not a high heat monomer. The copolymers can have excellent properties, including high Tg, high heat distortion temperature, good impact properties, thermal stability, and/or resistance to yellowing. The copolymers can also have specific architectures demonstrated by the number of particular types of linkages. The hydrolytic stability of the copolycarbonate-polyesters described herein can be improved by limiting the number of linkages of formula (15)

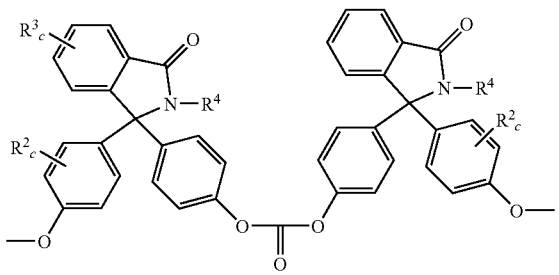

(15)

also referred to herein as BHPD-carbonate-BHPD linkages. The chemical variables $R^3$, $R^2$, $R^4$, and c are defined above.

As used herein, the term "polycarbonate units" means repeating structural carbonate units of formula (1)

(1)

in which at least about 60 percent of the total number of $R^1$ groups are divalent aromatic organic radicals and the balance thereof are divalent aliphatic, alicyclic, or aromatic radicals. In one embodiment, each $R^1$ is an aromatic organic radical, for example a radical of formula (2)

$$-A^1-Y^1-A^2-$$ (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

The carbonate units of formula (2) may be produced by the reaction of dihydroxy compounds of the formula HO—$R^1$—OH, specifically a dihydroxy compound of formula (3)

$$HO-A^1-Y^1-A^2-OH$$ (3)

wherein $Y^1$, $A^1$ and $A^2$ are as described above. Included are bisphenol compounds of formula (4)

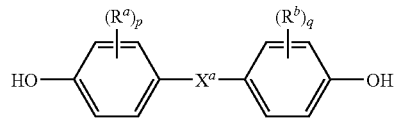

(4)

wherein $R^a$ and $R^b$ each represent a halogen atom or a monovalent hydrocarbon group and may be the same or different; p and q are each independently integers of 0 to 4; and $X^a$ represents a group having the formula

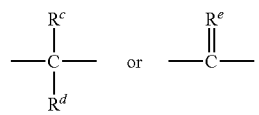

wherein $R^c$ and $R^d$ each independently represent a hydrogen atom or a monovalent linear or cyclic hydrocarbon group and $R^e$ is a divalent hydrocarbon group.

Another type of suitable dihydroxy aromatic radical $R^f$ is derived from an aromatic dihydroxy compound of formula (5)

(5)

wherein each $R^f$ is independently a halogen atom, a $C_{1-10}$ hydrocarbon group, or a $C_{1-10}$ halogen substituted hydrocarbon group, and n is 0 to 4. The halogen is usually bromine.

Bisphenols containing alkyl cyclohexane units may also be used, for example those of formula (6)

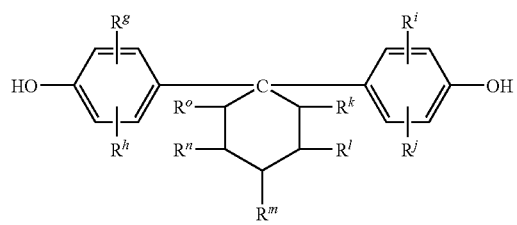

(6)

wherein $R^g$—$R^j$ are each independently hydrogen, $C_{1-12}$ alkyl, or halogen; and $R^k$—$R^o$ are each independently hydrogen or $C_{1-12}$ alkyl. Another example of a bisphenol containing a cycloalkane unit is the reaction product of two moles of a phenol with one mole of a hydrogenated isophorone.

Some illustrative, non-limiting examples of suitable dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl)

isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 4-bromoresorcinol, 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, and the like, catechol, hydroquinone, substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, and 2,3,5,6-tetrabromo, and the like, as well as combinations comprising at least one of the foregoing dihydroxy compounds.

Specific examples of the types of bisphenol compounds that may be represented by formula 5 include 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, and 1,1-bis(4-hydroxy-3-methylphenyl)cyclohexane (DMBPC). Combinations comprising at least one of the foregoing dihydroxy compounds may also be used. In one specific embodiment, carbonate units of formula (3) derived from bisphenol A are present, which each of $A^1$ and $A^2$ is p-phenylene and $Y^1$ is isopropylidene in formula (4).

The copolycarbonate-polyesters further contain, in addition to recurring carbonate chain units of formula (1), repeating units of formula (7)

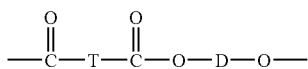
(7)

wherein D is a divalent $C_{6-18}$ aromatic radical derived from an aromatic diol, with the proviso that D is not derived from a high Tg monomer as described below. In one embodiment, D is derived from an aromatic dihydroxy compound of formula (4) or (5) above. Mixtures of different types of aromatic dihydroxy compounds can be used. The different types of units can be present in the polymer chain as individual units, or as blocks comprising multiples of the same units.

T in formula (7) is a radical derived from a dicarboxylic acid, and can be, for example, a divalent $C_{7-20}$ alkyl aromatic radical or a divalent $C_{6-20}$ aromatic radical. Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 91:9 to about 2:98.

The copolycarbonate-polyesters further comprise ester units derived from the reaction of an aromatic dicarboxylic acid and a high Tg monomer of formula (8)

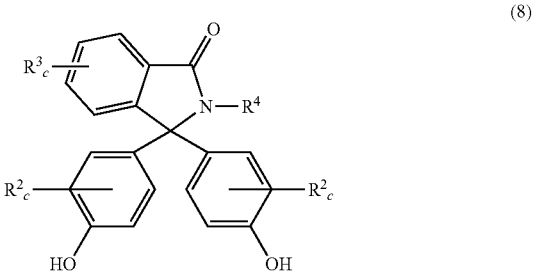
(8)

wherein $R^2$ and $R^3$ are each independently a halogen or a $C_{1-6}$ alkyl group, $R^4$ is a methyl or phenyl group, and each c is independently 0 to 4. In a specific embodiment, each c is 0. In another embodiment, $R^4$ is a phenyl group. In another specific embodiment, the high Tg monomer is BHPD, which has the following formula:

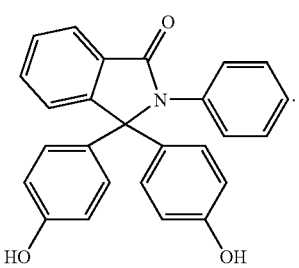 [SMILES: O=C1c2ccccc2C(c2ccc(O)cc2)(c2ccc(O)cc2)N1c1ccccc1]

The ester units derived from the reaction of an aromatic dicarboxylic acid and a high Tg monomer of formula (8) are of formula (9)

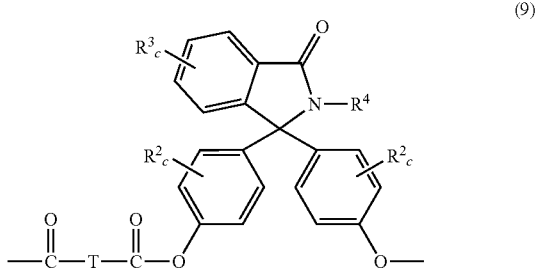

(9)

wherein $R^2$ and $R^3$ are each independently a halogen or a $C_{1-6}$ alkyl group, $R^4$ is a methyl or phenyl group, each c is independently 0 to 4, and T is as described above. The different types of units represented by formulas (7) and (9) can be present in the polymer chain as individual units, or as blocks comprising multiples of the same units.

In one specific embodiment, D is a $C_{6-12}$ arylene radical and T is p-phenylene, m-phenylene, naphthalenyl, or a mixture thereof. In another specific embodiment, one or both of the polyester units of formula (7) and (9) are derived from the reaction of a combination of isophthalic and terephthalic diacids (or derivatives thereof) with resorcinol. In still another specific embodiment, the polyester unit of formula (7) is derived from the reaction of a combination of isophthalic acid and terephthalic acid with bisphenol-A. In any one or more of the foregoing specific embodiments, the polycarbonate units are derived from bisphenol A.

The copolycarbonate-polyesters can be manufactured by processes such as interfacial polymerization. Although the reaction conditions for interfacial polymerization can vary, an exemplary process generally involves dissolving or dispersing a dihydroxy compound in aqueous caustic soda or potash, adding the resulting mixture to a suitable water-immiscible solvent medium, and contacting the reactants with an aromatic dicarboxylic acid or derivative thereof in the presence of a suitable catalyst such as triethylamine or a phase transfer catalyst, under controlled pH conditions, e.g., about 8 to about 10, to produce a reactive polyester intermediate. The most commonly used water immiscible solvents include methylene chloride, 1,2-dichloroethane, chlorobenzene, toluene, and the like.

In order to minimize the number of BHPD-carbonate-BHPD linkages in the copolymer, BHPD is the sole dihydroxy compound initially present in the formation of the reactive polyester intermediate. After giving BHPD sufficient time to react, typically 5 to 15 minutes, then a dihydroxy compound of formula (4) or (5) is added to form the reactive polyester intermediate.

Among the phase transfer catalysts that can be used are catalysts of the formula $(R^{10})_4Q^+X$, wherein each $R^{10}$ is the same or different, and is a $C_{1-10}$ alkyl group; Q is a nitrogen or phosphorus atom; and X is a halogen atom, a hydroxide, a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. In a specific embodiment X is a halogen such as chloride or a hydroxyl group. An effective amount of a phase transfer catalyst is typically about 0.1 to about 10 wt. %, specifically about 0.5 to about 2 wt. % based on the weight of bisphenol in the reaction mixture.

Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

The reactive polyester intermediate can be dihydroxy-terminated or acid halide-terminated, depending on reaction conditions. For example, hydroxy-terminated polyester oligomers can be formed by using an excess of the dihydroxy compounds. Acid halide-terminated polyester oligomers can be formed by using an excess of acid chloride. The reactive polyester intermediate may or may not be isolated. For ease of manufacture, the reaction mixture containing the reactive polyester intermediate is not isolated, but is directly contacted with a carbonate precursor, for example a carbonyl halide such as carbonyl bromide or carbonyl chloride, or a haloformate such as a bishaloformate of a dihydric phenol (e.g., the bischloroformates of bisphenol A, hydroquinone, or the like). Combinations comprising at least one of the foregoing types of carbonate precursors may also be used.

The contacting is carried out in the presence of a compound having the formula HO—$R^1$—OH, to provide the carbonate units of formula (1). In one embodiment, the same dihydroxy compound is used to provide both the moiety D in formula (8) and the moiety $R^1$ in formula (1). Alternatively, a different dihydroxy compound than that used to provide the moiety D in formula (8) is used.

The molar ratio of carbonate units to ester units in the copolymers can vary broadly depending on the identity of the carbonate units and ester units, and the desired properties of the copolymer. The ratio of carbonate units to ester units can be adjusted from 1:99 to 99:1, specifically 10:90 to 90:10, more specifically, 20:80 to 80:20, 30:70 to 70:30, 40:60 to 60:40, or 50:50 to any one of the foregoing end points, by adjusting the relative ratio of starting material and reaction conditions.

The molar ratio ester units of formula (7) (those derived from an aromatic diol, i.e., HO-D-OH) to ester units of formula (9) (those derived from a high Tg monomer) in the copolymer can be adjusted by varying the ratio of the diol to BHPD in the starting mixture, as well as reaction conditions. The molar ratio of ester units of formula (7) to ester units of formula (9) is adjusted to 0.1:99.9 to 99.9:0.1, depending on the T groups, the $R^1$ groups, and the desired end properties of the copolymer. In various embodiments, the molar ratio of ester units of formula (7) to ester units of formula (9) is 1:99 to 99:1, 10:90 to 90:10, 20:80 to 80:20, 30:70 to 70:30, 40:60 to 60:40 or 50:50 to any one of the foregoing endpoints.

Another feature of the copolymers that is subject to variation by control of starting materials and reaction conditions is the relative length of the polyester blocks and polycarbonate blocks. For example, it may be desirable to produce copolymers having relatively shorter polyester blocks and relatively longer polycarbonate blocks; copolymers having polyester blocks and polycarbonate blocks of approximately equal length; or copolymers having relatively longer polyester blocks and relatively shorter polycarbonate blocks. It may also be desirable to have a narrower or broader distribution of block lengths for either the polyester blocks, the polycarbonate blocks, or both. For example, copolymers having a narrow distribution of shorter polyester blocks with a narrower or broader distribution of longer polycarbonate blocks may result in more transparent polymers.

Those of skill in the art will readily recognize that during the interfacial reaction of mixtures comprising the high Tg monomer, a certain amount of the high Tg monomer can become incorporated into the copolymer as carbonate units. The relative degree of such incorporation can be adjusted by varying the type of monomers used in the other copolymer units and the reaction conditions. In one embodiment, the number of carbonate units derived from BHPD in the copolymers is less than 50% of the total number of carbonate units, specifically less than 40%, more specifically less than 30%, still more specifically less than 20%, and even more specifically less than 10%, down to 1% of the total number of carbonate units.

It has also been discovered that the quantity of BHPD-carbonate-BHPD linkages has a strong influence on the hydrolytic stability of the copolycarbonate-polyesters. The quantity of BHPD-carbonate-BHPD linkages can be less than or equal to 15%, or, more specifically, less than or equal to 12%, or, even more specifically less than or equal to 10%, based on the total number of carbonate linkages. The quantity of BHPD-carbonate-BHPD can be greater than 1% of the total number of carbonate linkages.

The copolycarbonate-polyesters have a number of desirable properties, including high Tg, high heat distortion temperature, good impact properties, thermal stability, absence of color, and/or resistance to yellowing.

The amount and type of other polymers and/or additives used with the copolycarbonate-polyesters are selected so as to provide the desired properties to the copolycarbonate-polyesters without substantially adversely impacting other properties needed for a given application. Such selections may be made without undue experimentation by one of ordinary skill in the art, based on the desired properties of the composition and the known properties of the additives. For example, use of certain polymers and/or additives can be limited by the processing conditions used for the copolycarbonate-polyesters. In one embodiment described below, films comprising the copolycarbonate-polyesters are formed by solution casting. Other polymers and/or additives (for example, impact modifiers, UV stabilizers, and the like), will preferably also be soluble in the solution used to cast the film. The amount and type of other polymers and/or additives used with the copolycarbonate-polyesters may also be limited by the intended application. For example, where a transparent film is desired, it may not be possible to use certain impact modifiers, fillers, colorants, or anti-drip agents.

The copolycarbonate-polyesters described herein can be used in combination with other polymers, including other homopolycarbonates, polycarbonate copolymers comprising different $R^1$ groups, and/or copolymers comprising polycarbonate units and other polymer units such as ester units or diorganosiloxane units. As used herein, a "combination" is inclusive of blends, mixtures, alloys, and the like. The copolycarbonates may also be used in combination with other polymers, for example polyesters such as polyarylates, polyacetals, polystyrenes, polyamides, polyamideimides, polyimides, polyetherimides, polysulfones such as polyarylsulfones and polyethersulfones, polysulfonates, polysulfonamides polysulfides such as polyphenylene sulfides, polythioesters, polytetrafluoroethylenes, polyetherketones, polyether etherketones, polyether ketone ketones, polyvinyl ethers, polyvinyl thioethers, polyvinyl, polyvinyl ketones, polyvinyl halides alcohols such as polyvinyl chlorides, polyvinyl nitriles, polyvinyl esters, or a combination comprising at least one of the foregoing polymers.

The copolycarbonate-polyesters may further be combined with an impact modifier composition, to increase impact resistance. These impact modifiers include elastomer-modified graft copolymers comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers.

Suitable conjugated diene monomers for preparing the elastomer phase are of formula (10)

(10)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (11)

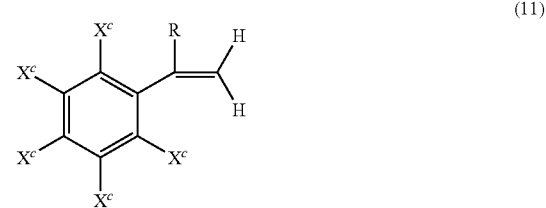

(11)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidylmeth)acrylates, and monomers of the generic formula (10)

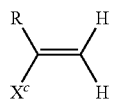
(12)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (12) include acrylonitrile, ethacrylonitrile, methacrylonitrile, alpha-chloroacrylonitrile, beta-chloroacrylonitrile, alpha-bromoacrylonitrile, acrylic acid, methyl(meth) acrylate, ethyl(meth)acrylate, n-butyl(meth)acrylate, t-butyl (meth)acrylate, n-propyl(meth)acrylate, isopropyl(meth) acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl(meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt. % of comonomers of formulas (8), (9), or (10). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (11) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (12). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl (meth)acrylate, ethyl(meth)acrylate, n-propyl(meth)acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt. % elastomer-modified graft copolymer and about 5 to about 65 wt. % graft (co)polymer, based on the total weight of the impact modifier. In another embodiment, such impact modifiers comprise about 50 to about 85 wt. %, more specifically about 75 to about 85 wt. % rubber-modified graft copolymer, together with about 15 to about 50 wt. %, more specifically about 15 to about 25 wt. % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched alkyl group and $R^e$ is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (11) or (12), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

In one embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers may be used providing it is free of the alkali metal salts of fatty acids, alkali metal carbonates and other basic materials.

A specific impact modifier of this type is an MBS impact modifier wherein the butadiene substrate is prepared using above-described sulfonates, sulfates, or phosphates as surfactants. It is also preferred that the impact modifier have a pH of about 3 to about 8, specifically about 4 to about 7.

Various additives ordinarily incorporated into the copolymer resin compositions, with the proviso that the additives are preferably selected so as to not significantly adversely affect the desired properties of the copolycarbonate-polyesters. Mixtures of additives may be used. Such additives may be mixed at a suitable time during the mixing of the components for forming the composition.

Suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide(aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about 1 to about 500 parts by weight, based on 100 parts by weight of the copolycarbonate-polyester resin.

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 1 to about 10 parts by weight, based on 100 parts by weight of the copolycarbonate-polyester resin.

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, aromatic phosphines such as triphenylphosphine, or combinations comprising at least one of the foregoing heat stabilizers. Heat stabilizers are generally used in amounts of about 1 to about 10 parts by weight, based on 100 parts by weight of the copolycarbonate-polyester resin.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 1 to about 10 parts by weight, based on 100 parts by weight of the copolycarbonate-polyester resin.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 1 to about 10 parts by weight, based on 100 parts by weight of the copolycarbonate-polyester resin.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of about 1 to about 25 parts by weight, based on 100 parts by weight of the copolycarbonate-polyester resin.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide(polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat™ 6321 (Sanyo) or Pebax™ MH1657 (Atofina), Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of about 1 to about 25 parts by weight, based on 100 parts by weight of the copolycarbonate-polyester resin.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthranthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 1 to about 25 parts by weight, based on 100 parts by weight of the copolycarbonate-polyester resin.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_{2-8}$)olefin dyes; carbocyanine dyes; indanthrone dyes; phthalocyanine dyes; oxazine dyes; carbostyryl dyes; naptha-lenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of about 1 to about 25 parts by weight, based on 100 parts by weight of the copolycarbonate-polyester resin.

Where a foam is desired, suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, or ammonia gas, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents. Blowing agents are generally used in amounts of about 1 to about 50 parts by weight, based on 100 parts by weight of the copolycarbonate-polyester resin.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

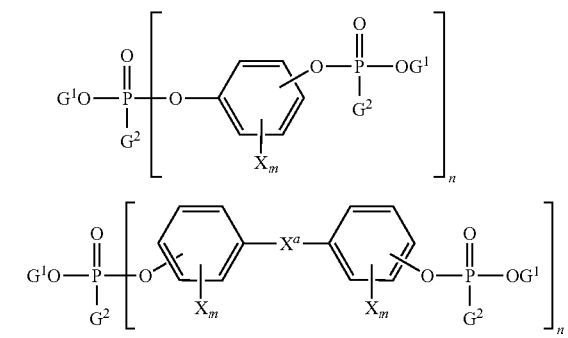

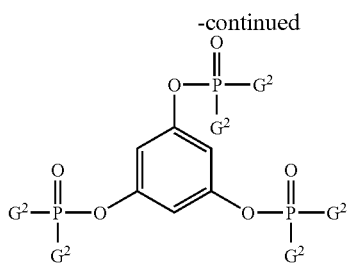

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants are generally present in amounts of about 1 to about 20 parts by weight, based on 100 parts by weight of the copolycarbonate-polyester resin.

Halogenated materials may also be used as flame retardants, for example halogenated compounds and resins of formula (13)

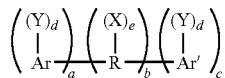 (13)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (13) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally present in amounts of about 1 to about 25 parts by weight, based on 100 parts by weight of the copolycarbonate-polyester resin.

Alternatively, the composition may be essentially free of chlorine and bromine Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of copolycarbonate-copolyester, and fire retardant.

Inorganic flame retardants may also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 1 to about 20 parts by weight, based on 100 parts by weight of the copolycarbonate-polyester resin.

Another useful type of flame retardant is a polysiloxane-polycarbonate copolymer having polydiorganosiloxane blocks comprise repeating structural units of formula (14)

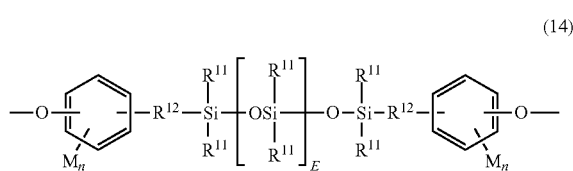

(14)

wherein each occurrence of $R^{11}$ is same or different, and is a $C_{1-13}$ monovalent organic radical. For example, $R^{11}$ may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing $R^{11}$ groups may be used in the same copolymer. $R^{12}$ in formula (6) is a divalent $C_1$-$C_8$ aliphatic group. Each M in formula (7) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

E in formula (14) is selected so as to provide an effective level of flame retardance to the thermoplastic composition. The value of E will therefore vary depending on the type and relative amount of each component in the thermoplastic composition, including the type and amount of polycarbonate, impact modifier, polysiloxane-polycarbonate copolymer, and other flame retardants. Suitable values for E may be determined by one of ordinary skill in the art without undue experimentation using the guidelines taught herein. Generally, E has an average value of 2 to about 1000, specifically about 10 to about 100, more specifically about 25 to about 75. In one embodiment, E has an average value of about 40 to about 60, and in still another embodiment, E has an average value of about 50. Where E is of a lower value, e.g., less than about 40, it may be necessary to use a relatively larger amount of the polysiloxane-polycarbonate copolymer. Conversely, where E is of a higher value, e.g., greater than about 40, it may be necessary to use a relatively smaller amount of the polysiloxane-polycarbonate copolymer.

In one embodiment, M is independently bromo or chloro, a $C_1$-$C_3$ alkyl group such as methyl, ethyl, or propyl, a $C_1$-$C_3$ alkoxy group such as methoxy, ethoxy, or propoxy, or a $C_6$-$C_7$ aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

The polysiloxane-polycarbonate copolymer may be manufactured by reaction of the corresponding dihydroxy polysiloxane with a carbonate source and a dihydroxy aromatic compound of formula (3), optionally in the presence of a phase transfer catalyst as described above. Suitable conditions are similar to those useful in forming polycarbonates. Alternatively, the polysiloxane-polycarbonate copolymers may be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising about 1 to about 60 mole percent of polydiorganosiloxane blocks relative to the moles of polycarbonate blocks, and more generally, about 3 to about 50 mole percent of polydiorganosiloxane blocks relative to the moles of polycarbonate blocks. When present, the copolymers may be used in amounts of about 5 to about 50 parts by weight, more specifically about 10 to about 40 parts by weight, based on 100 parts by weight of the copolycarbonate-polyester resin.

Anti-drip agents may also be used in the tie layer composition, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents are generally used in amounts of 0.1 to 5 percent by weight, based on 100 parts by weight of the copolycarbonate-polyester resin.

Radiation stabilizers may also be present, specifically gamma-radiation stabilizers. Suitable gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-penten-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon may be a methylol group (—$CH_2OH$) or it may be a member of a more complex hydrocarbon group such as —$CR^4HOH$ or —$CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.001 to 1 wt %, more specifically 0.01 to 0.5 wt %, based on 100 parts by weight of the copolycarbonate-polyester resin.

Thermoplastic compositions comprising the copolycarbonate-polyester resin and one or more of the optional other polymer(s), optional filler(s), and optional additive(s) foregoing may be manufactured by methods generally available in the art, for example, in one embodiment, in one manner of proceeding, powdered copolycarbonate-polyester resin and/or other optional components are first blended, in a HENSCHEL-Mixer® high speed mixer. Other low shear processes, including but not limited to hand mixing, may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets can be one-fourth inch (6.35 mm) long or less as desired. Such pellets may be used for subsequent molding, shaping, or forming.

Shaped, formed, or molded articles comprising the copolycarbonate-polyester compositions are also provided. The copolycarbonate-polyester compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. In addition, the polycarbonate compositions may be used for such application as automotive bezels and reflectors.

The copolycarbonate-polyester compositions are further illustrated by the following non-limiting examples, which are based on the following components.

EXAMPLE 1

To a 75-Liter (L) reactor equipped with mechanical agitation, condenser, and caustic scrubber vent system was charged 1150 gram (g) of BHPD (2.92 moles), 1950 g of BPA (8.55 moles), 130 g of p-cumylphenol (0.61 moles), 25 milliliters (ml) of a 70 wt % aqueous methyltributylammonium chloride solution (0.07 moles), 10 g of sodium gluconate, 13 L of deionized (DI) water, and 22 L of methylene chloride. A 50/50 wt % mixture of molten terephthaloyl dichloride/isophthaloyl dichloride (2100 g, 9.1 mole) was added at a rate of 100 g/minute while 50 wt % caustic solution was added at a rate sufficient to maintain the a reaction at a pH of 9.0. After the diacid chloride addition was complete, the reaction was stirred for 10 minutes at pH 9. Phosgene (300 g, 3.03 moles) was then added at a rate of 100 g/minute to the reactor while 50 wt % caustic was added to maintain a pH of 9.0. Triethylamine (15 ml, 0.1 moles) dissolved in 1 L methylene chloride was then added and the reaction stirred at pH 9 for 5 minutes. An additional 200 g phosgene (2.02 moles) was added at a rate of 100 g/minute while sufficient 50 wt % caustic was added to maintain the pH at 9.0. The reactor was then purged with nitrogen gas for 10 minutes to remove any residual phosgene.

The reactor contents were then transferred to another tank and centrifuged to remove the aqueous (brine) layer. The organic layer (containing copolymer) was washed with aqueous acid and then with deionized water until residual chloride ion levels were less than 2 parts per million (ppm). The copolymer was isolated by steam precipitation, followed by drying under $N_2$.

The dried resin powder had weight average molecular weight (Mw) of 28808 and a polydispersity index of 2.20 as determined by gel permeation chromatography (GPC) using a polycarbonate standard. The copolymer was found to have less than 1 ppm triethylamine, 0.63 ppm chloride ion, 0.03 ppm Fe, 73 ppm residual BPA, and 37 ppm residual BHPD. Differential scanning calorimetry (DSC) showed the copolymer to have a Tg of 219° C. Melt volume rate (MVR) was determined at 330° C. using a 2.16-kilogram weight, over 6 minutes, in accordance with ASTM D1238-04, and found to equal 1.8.

EXAMPLE 2

To a 75-L reactor equipped with mechanical agitation, condenser, and caustic scrubber vent system was charged 1200 g of BHPD (3.05 moles), 25 g p-cumylphenol (0.21 moles), 25 ml of a 70 wt % aqueous methyltributylammonium chloride solution (0.07 moles), 10 g sodium gluconate, 9 L DI water, and 14 L methylene chloride. A 50 wt % caustic solution (500 g of solution, 6.25 moles NaOH) was added as the reaction mixture was stirred. A 50/50 (by weight) mixture of molten terephthaloyl dichloride/isophthaloyl dichloride (508 g, 2.2 mole) was added at a rate of 50 g/minute while sufficient 50 wt % caustic was added to maintain a reaction pH of greater than 8.5. After the diacid chloride addition was complete, the reaction was stirred for 10 minutes at a pH of 9. BPA (1150 g, 5.04 moles), p-cumylphenol (75 g, 0.35 moles), triethylamine (30 ml, 0.2 moles), DI water (6 L), and methylene chloride (7 L) were then added to the reactor. Phosgene (750 g, 7.57 moles) was then added at a rate of 80 g/minute to the reactor while 50 wt % caustic was added to maintain a pH of 9.0. An additional 100 g phosgene (1.01 moles) was added at a rate of 80 g/minute while sufficient 50 wt % caustic was added to maintain a pH of 9.0. The reactor was then purged with nitrogen gas for 10 minutes to remove any residual phosgene.

The reactor contents were then transferred to another tank and centrifuged to remove the aqueous layer. The organic layer (containing copolymer) was washed with aqueous acid and then with deionized water until residual chloride ion levels were less than 2 ppm. The copolymer was isolated by steam precipitation followed by drying under nitrogen.

The dried resin powder had a weight average molecular weight of 28276 and a PDI of 2.57, determined as above. The copolymer was further found to have less than 1 ppm triethylamine, 0.77 ppm chloride ion, 0.03 ppm Fe, 72 ppm residual BPA, and 25 ppm residual BHPD. DSC of this polymer showed a Tg of 205° C. MVR (330° C./2.16 kg/6 minutes)=4.0.

EXAMPLES 3-5 AND COMPARATIVE EXAMPLES A-B

The properties of three copolycarbonate-polyesters produced as described above (Examples 3-5) were compared to two copolycarbonates having units derived from BPA and BHPD (Examples A-B). Production of such copolycarbonates is described, for example, in U.S. Pat. Nos. 5,344,910 and 5,455,310. The comparison is set forth in the Table below.

"Time dwell" refers to a rheological test requiring holding a sample at a specified temperature for a specified time, and monitoring the change in viscosity. More stable resins will undergo smaller changes in viscosity.

Weight loss was determined via TGA after holding the samples at the indicated temperature for 30 minutes.

TABLE 1

| Test | Ex. 3 | Ex. 4 | Ex. 5 | A | B |
|---|---|---|---|---|---|
| Tg (DSC) | 212.8 | 223.9 | 218.8 | 220.2 | 220 |
| MVR (330° C., 2.15 kg) | 1.81 | 1.38 | 1.8 | 5 | 3 |
| Viscosity at 350° C. | 1084.5 | 1304.3 | 1432.1 | 456.4 | 560 |
| Viscosity at 380° C. | 589.1 | 592.9 | 671.4 | 148.4 | |
| Time dwell at 350° C. | −17 | −17 | −13 | −30 | |
| Time dwell at 380° C. | −41 | −43 | −37 | | |
| Weight Loss at 350° C. | 1.24 | 0.96 | 0.86 | 1.17 | |
| Weight Loss at 380° C. | 2.09 | 3.1 | 2.51 | 4 | |

As may be seen by reference to Table 1, the Tg of the copolycarbonate-polyesters is comparable to that of the high heat polycarbonates.

Further, the time dwell at 350° C. suggest the copolycarbonate-polyesters are more thermally stable than the corresponding polycarbonates. The materials of this invention showed a 13-17% viscosity drop when held at 350° C. for 30 minutes, whereas the comparable polycarbonate showed a 30% viscosity drop. Although at 380° C. the copolycarbonate-polyesters lose viscosity (37-43%), the comparative polycarbonate lost so much viscosity that reliable numbers could not be obtained.

The comparative samples held at 380° C. showed a weight loss of 4%, while the copolycarbonate-polyesters lost only 2.1-3.1 wt %, suggesting that the polyestercarbonates are more thermally stable.

EXAMPLE 6 AND COMPARATIVE EXAMPLES C-D

The hydrolytic stability of a copolycarbonate-polyester produced as described above (Example 6) was compared to three copolycarbonates having units derived from BPA and BHPD (Examples C-D) having an equivalent Tg. Production of such polycarbonates is described, for example, in U.S. Pat. Nos. 5,344,910 and 5,455,310. Homogeneous hydrolysis was carried out in an anisole/methyl ethyl ketone (MEK)/water mixture at 60° C. A 2.00 gram sample of polymer was weighed into a 4 oz vial and dissolved in 50 mL of a 3:2 (by volume) mixture of anisole/methyl ethyl ketone at room temperature. Distilled water (0.15 ml, 3400 ppm) was added to the sample and the vial was sealed and placed in an oven at 60° C. Aliquots (about 8 ml) were periodically removed from the sample and the resin was precipitated into 150 ml stirring methanol at ambient temperature. The solid polymer was isolated via filtration, washed with methanol, and dried under vacuum at room temperature. Molecular weight for each sample was determined via GPC. Results are shown in Table 2.

TABLE 2

| Hydrolysis time (hours) | Sample, Molecular Weight | | | |
|---|---|---|---|---|
| | C | D | E | Example 6 |
| 20 | 24265 | 25139 | 24896 | 26991 |
| 44 | 20835 | 22237 | 21803 | 26022 |
| 102 | 16383 | 17240 | 17547 | 25286 |

The above data shows that the copolyester-copolycarbonates maintain molecular weight significantly better than prior art copolycarbonates having under hydrolytic conditions. This indicates that incorporating the high heat monomer into polyester blocks improves the hydrolytic stability of the polymers.

In order to explore the effects of polymer architecture the following polymers were made.

COMPARATIVE EXAMPLE E

Methylene chloride (20 liters (L)), water (12 liters), BPA (1140 g, 5 moles), BHPD (1965 g, 5 moles), methyltributylammonium chloride (25 g of 70 wt % aqueous solution), and sodium gluconate (10 g) were charged to a 75 liter reactor equipped with mechanical agitation, condenser, and caustic scrubber vent system. A molten 50/50 mixture (by weight) of isophthaloyl chloride/terephthaloyl chloride (1380 g, 6.8 mol) was added at a rate of 100 g/minute to the reactor while 50 wt % caustic was added as necessary to maintain pH=7-8. A solution of p-cumylphenol (110 g, 0.52 mole) in methylene chloride (700 milliliters (ml)) was co-fed during the acid chloride addition. Additional caustic was then added to raise the reactor to a pH of 8 to 9 while the batch was stirred for 10 minutes. Triethylamine (40 ml) was then added as a methylene chloride (500 ml) solution (was dissolved in methylene chloride?). An excess of phosgene (800 grams, 8.1 moles) was then added at 80 grams/minute while caustic was added at a rate to maintain a pH of 9 to 10. The reactor was purged with nitrogen.

The reactor contents were then transferred to another tank and centrifuged to remove the brine layer. The organic layer containing the polymer was washed on a centrifuge train with 1 N HCl and then with deionized water until residual chloride levels were less than 5 ppm. The polymer was isolated by steam precipitation followed by drying under hot nitrogen. The final dried resin had less than 1 ppm TEA, 1.2 ppm chloride ion, 18 ppm residual BPA monomer, and 0.08 ppm Fe.

EXAMPLE 7

Methylene chloride (10 L), methyltributylammonium chloride (25 g of 70 wt % aqueous solution), and a molten 50/50 mixture of isophthaloyl chloride/terephthaloyl chloride (1380 g, 6.8 mol) were charged to a 75 L reactor equipped with mechanical agitation, condenser, and caustic scrubber vent system. A solution of BHPD (1965 g, 5.0 mol) dissolved in water (7500 ml) and 50 wt % caustic (840 g) was added over approximately 15 minutes and the reactor stirred for 10 minutes. Methylene chloride (10 L), water (5 L), BPA (1140 g, 5.0 moles), p-cumylphenol (125 g, 0.59 mol) and sodium gluconate (10 g) were then charged and the reactor was stirred for an additional 10 minutes. Triethylamine (40 ml) was then added as a methylene chloride (500 ml) solution. An excess of phosgene (800 g, 8.1 mol) was then added at 80 g/minute while caustic was added at a rate to maintain a pH of 9 to 10. The reactor was purged with nitrogen.

The reactor contents were then transferred to another tank and centrifuged to remove the brine layer. The organic layer containing the polymer was washed on a centrifuge train with 1 N HCl and then with deionized water until residual chloride levels were less than 5 ppm. The polymer was isolated by steam precipitation followed by drying under hot nitrogen. The final dried resin had less than 1 ppm TEA, 1.4 ppm chloride ion, 7 ppm residual BPA monomer, and 0.05 ppm Fe.

COMPARATIVE EXAMPLE F

Methylene chloride (10 L) and a molten 50/50 mixture by weight of isophthaloyl chloride/terephthaloyl chloride (1380 g, 6.8 mol) were charged to a 75 L reactor equipped with mechanical agitation, condenser, and caustic scrubber vent system. Methylene chloride (10 L), water (5 L), BPA (1140 g, 5.0 mol), p-cumylphenol (110 g, 0.52 mol), methyltributylammonium chloride (25 g of 70 wt % aqueous solution), and sodium gluconate (10 g) were then charged to the reactor. 50 wt % caustic was then added over the course of approximately 15 minutes to adjust the reactor to a pH of 8. PPPBP (1965 g, 5.0 mol) dissolved in water (7500 ml) and 50 wt % caustic (840 g) was added over approximately 15 minutes and the reactor stirred for 10 minutes. Triethylamine (40 ml) was then added as a methylene chloride (500 ml) solution. An excess of phosgene (800 g, 8.1 mol) was then added at 80 g/min while caustic was added at a rate to maintain a pH of 9 to 10. The reactor was purged with nitrogen.

The reactor contents were then transferred to another tank and centrifuged to remove the brine layer. The organic layer containing the polymer was washed on a centrifuge train with 1N HCl and then with deionized water until residual chloride levels were 5 ppm. The polymer was isolated by steam precipitation followed by drying under hot nitrogen. The final dried resin had less than 1 ppm TEA, 3.6 ppm chloride ion, 8 ppm residual BPA monomer, and 0.23 ppm Fe.

COMPARATIVE EXAMPLE G

Methylene chloride (20 L), water (12 L), BPA (800 g, 3.5 mol), PPPBP (3200 g, 8.1 mol), p-cumylphenol (85 g, 0.40 mol) and sodium gluconate (10 g) were charged to a 75 L reactor equipped with mechanical agitation, condenser, and caustic scrubber vent system. Phosgene (1500 g, 15.1 mol) was then added at 80 g/min while caustic was added at a rate to maintain a pH of 9. Triethylamine (40 ml) was then added as a methylene chloride (500 ml) solution and additional caustic was added as necessary to maintain a reactor pH of 9. Additional phosgene (400 g, 4.0 mol) was then added at 80 g/min while caustic was added at a rate to maintain a pH of 9. The reactor was purged with nitrogen.

The reactor contents were then transferred to another tank and centrifuged to remove the brine layer. The organic layer containing the polymer was washed on a centrifuge train with 1N HCl and then with deionized water until residual chloride levels were less than 5 ppm. The polymer was isolated by steam precipitation followed by drying under hot nitrogen. The final dried resin had less than 1 ppm TEA, 0.8 ppm chloride ion, 7 ppm residual BPA monomer, and less than 0.05 ppm Fe.

Differential scanning calorimetry was used to determine the glass transition temperature (Tg) of Example 7 and Comparative Examples E, F and G. Example 7 and Comparative Examples E, F and G all had similar glass transition temperatures as shown in Table 3.

TABLE 3

|  | E | Ex. 7 | F | G |
|---|---|---|---|---|
| Tg (DSC), °C. | 243 | 246 | 241 | 239 |

The polymer architecture was determined by carbon 13 nuclear magnetic resonance (13C NMR). 500 mg of sample was dissolved in approximately 3.6 ml of deuterated chloroform with 1.5 wt % chromium (III) acetylacetonate relaxation agent and transferred to a 10 mm NMR tube. Samples were run on a 500 megaHertz (MHz) Varian Inova NMR instrument operating at 125.6 MHz for carbon, using 7500 scans and a pulse delay of 5 seconds. Results are shown in Table 4.

TABLE 4

|  | E | Ex. 7 | F | G |
|---|---|---|---|---|
| mole % diester | 68 | 68 | 68 | 0 |
| mole % carbonate | 32 | 32 | 32 | 100 |
| ratio of carbonate linkages by 13C NMR | | | | |
| BHPD-C(O)-BHPD | 61 | 9 | 87 | 49 |
| BHPD-C(O)-BPA | 33 | 8 | 13 | 35 |
| BPA-C(O)-BPA | 6 | 83 | 0 | 16 |
| Scaled to amount of carbonate in polymer | | | | |
| BHPD-C(O)-BHPD | 20 | 3 | 28 | 49 |
| BHPD-C(O)-BPA | 11 | 3 | 4 | 35 |
| BPA-C(O)-BPA | 2 | 27 | 0 | 16 |

Hydrolytic stability was determined using a homogeneous hydrolysis test, which eliminates variability due to particle size and water adsorption. In this test a 2 g sample was dissolved in an anisole/methyl isobutyl ketone/water solution and aged at 60° C. in sealed containers as the molecular weight was measured periodically. The anisole/methyl isobutyl ketone/water solution was made of 0.15 g water and 50 g of an anisole/methyl isobutyl ketone stock solution. The stock solution was made of 150 g of anisole and 100 g of methyl isobutyl ketone. Samples were tested for weight average molecular weight using GPC analysis and polycarbonate standards. Data from this experiment is listed in Table 5 and the Mw drop is plotted graphically in FIG. 1.

TABLE 5

| Solvent Stock solution | 50 | 50 | 50 | 50 |
|---|---|---|---|---|
| Water | 0.15 | 0.15 | 0.15 | 0.15 |
| E | 2 | | | |
| Ex. 7 | | 2 | | |
| F | | | 2 | |
| G | | | | 2 |
| Mw Data | | | | |
|  | E | Ex. 7 | F | G |
| Time (hours) at 60° C. | | | | |
| 0 | 23091 | 23163 | 21680 | 23270 |
| 24 | 21938 | 22843 | 20506 | 20449 |
| 48 | 21217 | 22547 | 20011 | 19053 |
| 96 | 20262 | 22209 | 19280 | 16485 |
| 144 | 19678 | 22022 | 18875 | 15305 |
| % Mw loss | | | | |
| Time (hours) | | | | |
| 0 | 0.0 | 0.0 | 0.0 | 0.0 |
| 24 | 5.0 | 1.4 | 5.4 | 12.1 |
| 48 | 8.1 | 2.7 | 7.7 | 18.1 |

TABLE 5-continued

| 96  | 12.3 | 4.1 | 11.1 | 29.2 |
| 144 | 14.8 | 4.9 | 12.9 | 34.2 |

This data shows that even though Comparative Examples E and F and Example 7 all have the same composition, the architecture of Example 7 with minimal BHPD-carbonate-BHPD linkages has superior hydrolytic stability. Moreover, all three polyestercarbonate samples have improved hydrolytic stability relative to the Comparative Example G (polycarbonate with equivalent Tg and Mw), as the simple polycarbonate has higher levels of BHPD-C(O)-BHPD linkages.

The singular forms "a," "an," and "the" include plural referents unless the context clearly dictates otherwise. The endpoints of all ranges reciting the same property or quantity are independently combinable and inclusive of the recited endpoint. All references are incorporated herein by reference. "Optional" or "optionally" means that the subsequently described event or circumstance may or may not occur, and that the description includes instances where the event occurs and instances where it does not. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A copolycarbonate-polyester, comprising units of formula

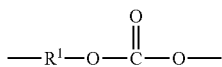

wherein at least 60 percent of the total number of $R^1$ groups are divalent aromatic organic radicals and the balance thereof are divalent aliphatic or alicyclic radicals;

units of formula

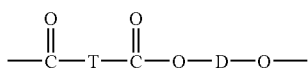

wherein T is a $C_{7-20}$ divalent alkyl aromatic radical or a $C_{6-20}$ divalent aromatic radical, and D is a divalent $C_{6-20}$ aromatic radical; and units of the formula

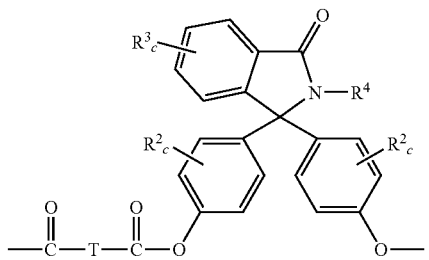

wherein $R^2$ and $R^3$ are each independently a halogen or a $C_{1-6}$ alkyl group, $R^4$ is a methyl or phenyl group, each c is independently 0 to 4, and T is as described above and wherein units of the formula (15)

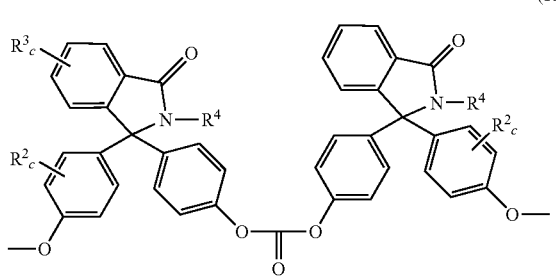

(15)

are present in an amount less than or equal to 15% based on the total number of carbonate linkages as determined by carbon 13 nuclear magnetic resonance spectroscopy.

2. The copolycarbonate-polyester of claim 1, wherein at least a portion of the $R^1$ groups are derived from a dihydroxy compound of the formula

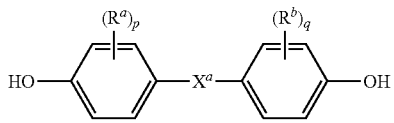

wherein $R^a$ and $R^b$ are each independently a halogen atom or a monovalent $C_{1-6}$ alkyl group; p and q are each independently integers of 0 to 4; and $X^a$ is one of the following groups:

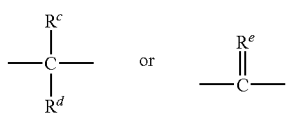

wherein $R^c$ and $R^d$ are each independently a hydrogen atom or a $C_{1-29}$ alkyl group, or $R^c$, C, and $R^d$ taken together are a divalent $C_{3-10}$ cycloalkyl group that is optionally substituted with one or more $C_{1-10}$ alkyl groups, and $R^e$ is a divalent hydrocarbon group.

3. The copolycarbonate-polyester of claim 2, wherein p and q are each zero and $X^a$ is 2,2-propylene.

4. The copolycarbonate-polyester of claim 1, wherein T is a $C_{6-20}$ divalent aromatic radical.

5. The copolycarbonate-polyester of claim 1, wherein T is a divalent isophthaloyl radical and/or a divalent terephthaloyl radical.

6. The copolycarbonate-polyester of claim 1, wherein D is derived from an aromatic diol of the formula

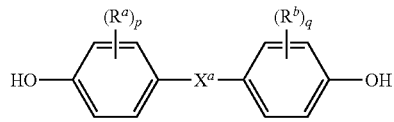

wherein $R^a$ and $R^b$ are each independently a halogen atom or a monovalent $C_{1-6}$ alkyl group; p and q are each independently integers of 0 to 4; and $X^a$ is one of the following groups:

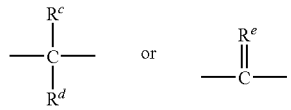

wherein $R^c$ and $R^d$ are each independently a hydrogen atom or a $C_{1-29}$ alkyl group, or $R^c$, C, and $R^d$ taken together are a divalent $C_{3-10}$ cycloalkyl group that is optionally substituted with one or more $C_{1-10}$ alkyl groups, and $R^e$ is a divalent hydrocarbon group.

7. The copolycarbonate-polyester of claim 6, wherein p and q are each zero and $X^a$ is 2,2-propylene.

8. The copolycarbonate-polyester of claim 1, wherein each c is 0.

9. The copolycarbonate-polyester of claim 1, wherein each c is 0 and $R^4$ is a phenyl group.

10. The copolycarbonate-polyester of claim 1, having a Tg of 180° C. to 300° C.

11. The copolycarbonate-polyester of claim 1, wherein the units of formula (15) are present in an amount less than or equal to 12% based on the total number of carbonate linkages.

12. The copolycarbonate-polyester of claim 1, wherein the units of formula (15) are present in an amount less than or equal to 10% based on the total number of carbonate linkages.

13. An article comprising the copolycarbonate-polyester of claim 1.

14. A copolycarbonate-polyester, comprising
units of formula

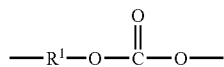

wherein at least 60 percent of the total number of $R^1$ groups are divalent aromatic organic radicals and the balance thereof are divalent aliphatic or alicyclic radicals;
units of formula

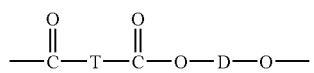

wherein T is a divalent isophthaloyl radical and/or a divalent terephthaloyl radical, and D is a divalent $C_{6-20}$ aromatic radical; and units of the formula

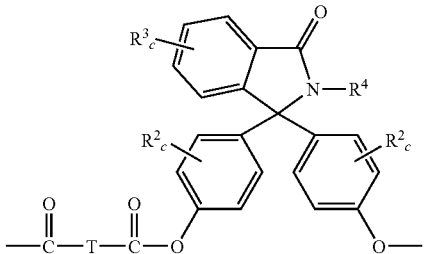

wherein $R^2$ and $R^3$ are each independently a halogen or a $C_{1-6}$ alkyl group, $R^4$ is a phenyl group, each c is independently 0 to 4, and T is as described above and wherein units of the formula (15)

(15)

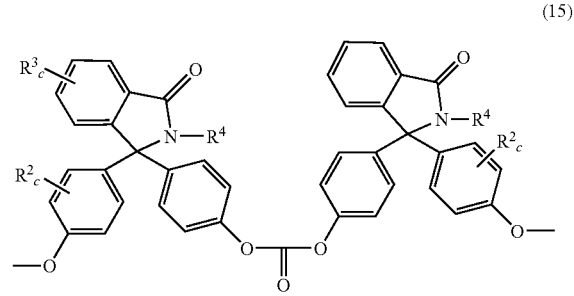

are present in an amount less than or equal to 15% based on the total number of carbonate linkages as determined by carbon 13 nuclear magnetic resonance spectroscopy.

15. A copolycarbonate-polyester, comprising
units of formula

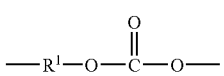

wherein at least 60 percent of the total number of $R^1$ groups are divalent aromatic organic radicals and the balance thereof are divalent aliphatic or alicyclic radicals;
units of formula

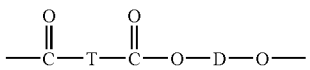

wherein T is a divalent isophthaloyl radical and/or a divalent terephthaloyl radical, and D is bisphenol A; and units of the formula (15)

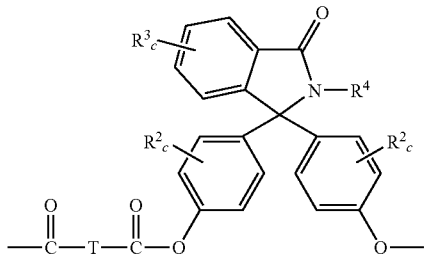
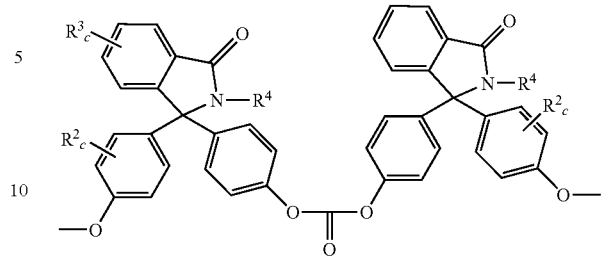

wherein $R^2$ and $R^3$ are each independently a halogen or a $C_{1-6}$ alkyl group, $R^4$ is a phenyl group, each c is independently 0 to 4, and T is as described above and wherein units of the formula (15) are present in an amount less than or equal to 15% based on the total number of carbonate linkages as determined by carbon 13 nuclear magnetic resonance spectroscopy.

* * * * *